United States Patent [19]

Kottke et al.

[11] Patent Number: 5,704,257
[45] Date of Patent: Jan. 6, 1998

[54] SECURING MECHANISM FOR SECURING A DRIVE SHAFT OF A ROTATING TOOL MEMBER OF A WORKING TOOL

[75] Inventors: Joachim Kottke, Remseck; Gerhard Zerrer, Korb; Thomas Schweigert, Kernen, all of Germany

[73] Assignee: Andreas Stihl, Waiblingen, Germany

[21] Appl. No.: 556,009

[22] Filed: Nov. 13, 1995

[30] Foreign Application Priority Data

Nov. 17, 1994 [DE] Germany .................. 44 40 961.3

[51] Int. Cl.⁶ .................. B23B 29/24; G05G 5/06
[52] U.S. Cl. .................. 74/813 L; 74/527; 74/531
[58] Field of Search .................. 74/567, 568, 813 L, 74/526, 527, 528, 531; 188/336, 67

[56] References Cited

U.S. PATENT DOCUMENTS

| 3,714,893 | 2/1973 | Cole .................. 74/568 |
| 3,802,297 | 4/1974 | Schiler .................. 74/813 L |
| 3,811,338 | 5/1974 | Federspiel .................. 74/527 |
| 3,878,736 | 4/1975 | Main et al. .................. 74/527 |
| 3,899,852 | 8/1975 | Batson . | |
| 3,913,417 | 10/1975 | Vangor .................. 74/813 L |
| 3,949,842 | 4/1976 | Kiehn .................. 188/189 |
| 4,076,093 | 2/1978 | Mizuno .................. 180/82 R |
| 4,337,850 | 7/1982 | Shimokura .................. 188/319 |
| 4,658,608 | 4/1987 | Fox .................. 70/179 |
| 4,690,252 | 9/1987 | Kottke et al. . | |
| 4,991,458 | 2/1991 | Stuedemann .................. 74/492 |
| 5,214,980 | 6/1993 | Saeda et al. .................. 74/527 |
| 5,435,424 | 7/1995 | Murakami et al. .................. 74/475 |

FOREIGN PATENT DOCUMENTS 0438611  7/1991  European Pat. Off. .

*Primary Examiner*—Vinh T. Luong
*Attorney, Agent, or Firm*—Robert W. Becker & Associates

[57] ABSTRACT

A securing mechanism for securing a drive shaft of a rotating tool member of a working tool against rotation includes a securing member fixedly connected to the drive shaft. The securing member has at least one engagement opening. A lock bolt for engaging the at least one engagement opening is provided. The lock bolt is axially displaceably positioned in the housing of the working tool. A spring for biasing the lock bolt into engagement with the at least one engagement opening is provided. An actuating element for displacing the lock bolt from an engaged position, in which the lock bolt engages the at least one engagement opening, into a disengaged position, in which the lock bolt is removed from the engagement opening, is provided. The actuator element is positioned adjacent to the lock bolt and has a cam member extending into the travel path of the lock bolt. The cam member has a securing position in which the cam member is locked at the housing for securing the lock bolt against the force of the spring in the disengaged position.

20 Claims, 6 Drawing Sheets

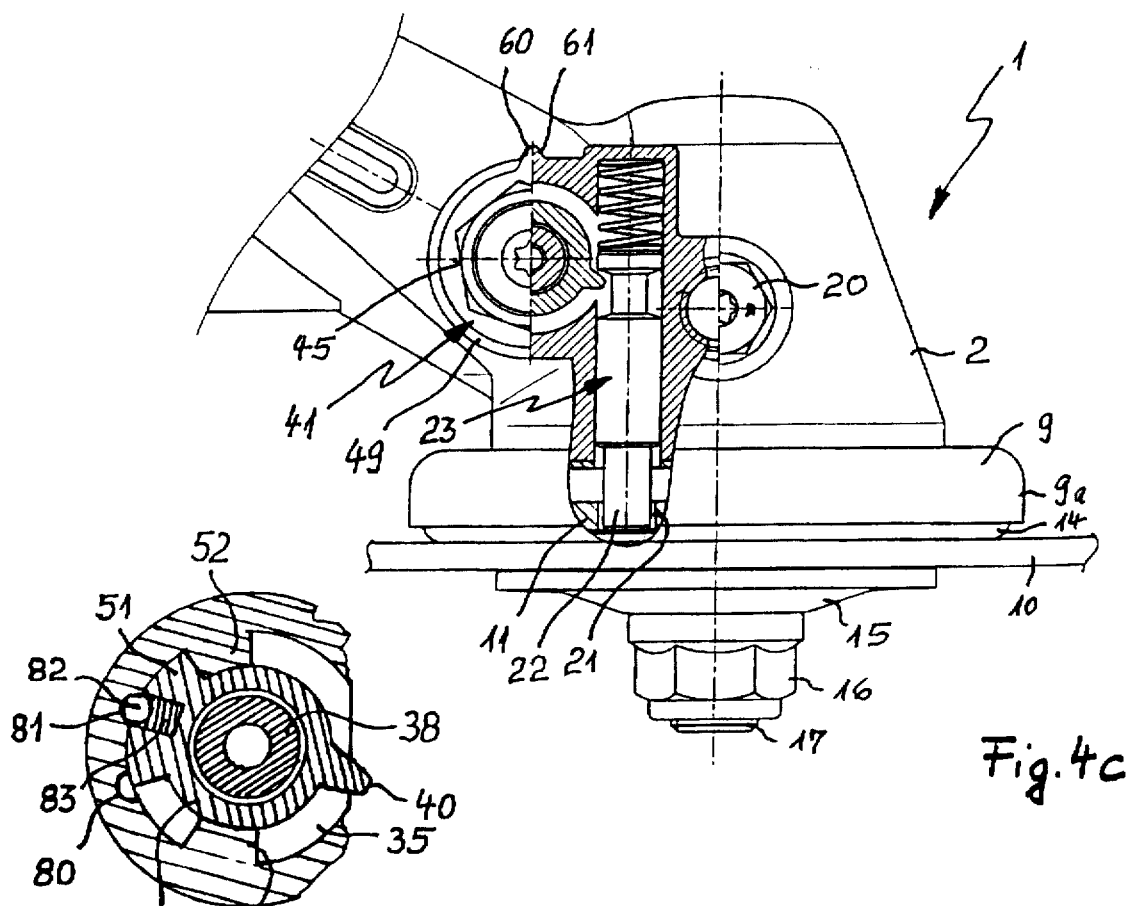
Fig. 4c
Fig. 6
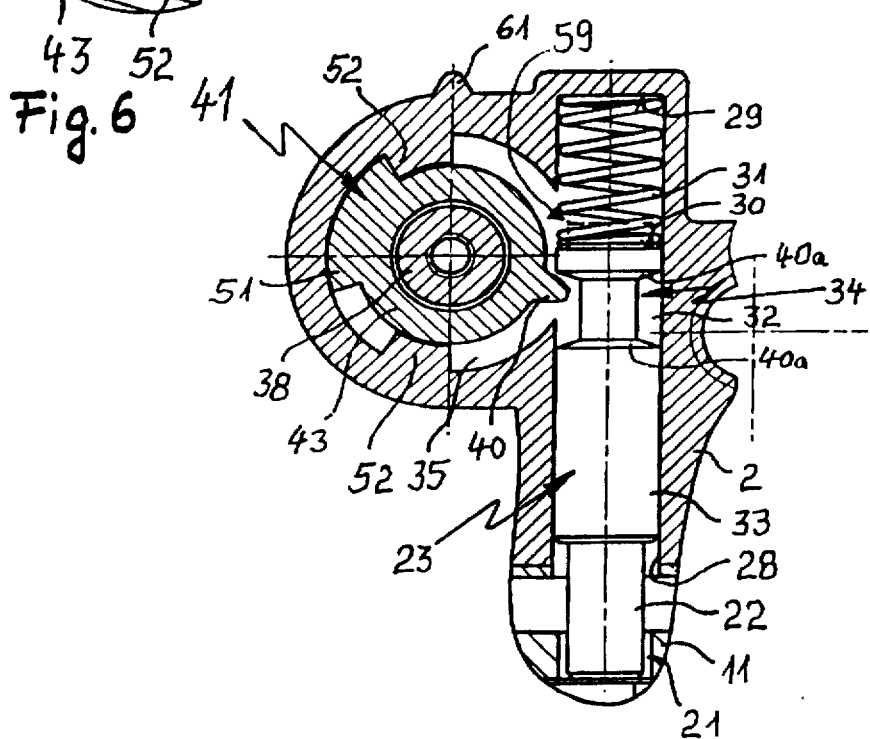
Fig. 5c

SECURING MECHANISM FOR SECURING A DRIVE SHAFT OF A ROTATING TOOL MEMBER OF A WORKING TOOL

BACKGROUND OF THE INVENTION

The present invention relates to a securing mechanism for the drive shaft of a rotating tool member of a working tool, especially a cutting tool member of a free cutting device (trimmer, blade cutter) comprising a securing member fixedly connected to the drive shaft which securing member has one engagement opening for engaging a lock bolt. The lock bolt is axially displaceably supported within the housing of the working tool and biased in direction toward the engagement opening by a spring. An actuating element for displacing the lock bolt from an engaged position in the engagement opening into a disengaged position is provided.

From U.S. Pat. No. 4,690,252 a securing mechanism of the aforementioned kind is known in which the lock bolt is supported via a pressure spring at an actuating element. For blocking the tool member, the actuating element must be displaced against the force of the spring relative to the lock bolt and secured in this position. For this action special tools or a special manipulation of the actuating element is necessary. After displacement of the actuating element relative to the lock bolt, the lock bolt is loaded in direction toward the engaged position by the pressure spring so that upon rotation of the tool member the lock bolt engages an engagement opening of the securing element which is fixedly connected to the drive shaft so that by this action the drive shaft is blocked.

This securing mechanism is comprised of a plurality of parts movable relative to one another which during operation in dirt-laden environments can result in functional disruptions due to dirt particles penetrating into the device.

From U.S. Pat. No. 3,899,852 a securing mechanism is known in which the lock bolt is loaded by a pressure spring into the disengaged position. For blocking the drive shaft, the lock bolt must be forced against the force of the pressure spring into an engagement opening of the securing element and must be held in this position. The securing mechanism thus has a simple construction; however, it also exhibits problems with respect to dirt depositions in the area of the lock bolt. When dirt depositions are so great that the pressure spring can no longer retain the lock bolt in the disengaged position, the working tool must be opened and the lock bolt must be lifted against the dirt deposition.

It is therefore an object of the present invention to provide a securing mechanism of the aforementioned kind with which a reliable function is ensured even when the working tool is used in dirt-laden environments.

SUMMARY OF THE INVENTION

The securing mechanism for securing a drive shaft of a rotating tool member of a working tool against rotation according to the present invention is primarily characterized by:

A securing member fixedly connected to the drive shaft, the securing member having at least one engagement opening;

A lock bolt for engaging the at least one engagement opening;

The lock bolt axially displaceably positioned in a housing of the working tool;

A spring for biasing the lock bolt into engagement with the at least one engagement opening;

An actuating element for displacing the lock bolt from an engaged position, in which the lock bolt engages the at least one engagement opening, into a disengaged position, in which the lock bolt is removed from the engagement opening;

Wherein the actuating element is positioned adjacent to the lock bolt and comprises a cam member extending into a travel path of the lock bolt; and Wherein the cam member has a securing position in which the cam member is locked at the housing and secures the lock bolt against the force of the spring in the disengaged position.

Advantageously, the cam member in the securing position is frictionally secured at the housing.

Preferably, with an increasing angle of rotation of the actuating element in a direction toward the securing position of the cam member a frictional force for frictionally securing the cam member at the housing increases.

Preferably, the cam member in the securing position is secured by positive locking.

The actuating element is preferably a cylindrical turn knob comprising a head, positioned external to the housing, and an inner section positioned inside the housing, wherein the cam member is connected to the inner section.

Advantageously, the head has an annular flange that rests frictionally at a surface of the housing.

Preferably, the actuating element further comprises a guide section between the head and the inner section. The housing in this embodiment has a receiving opening. The guide section and the inner section are received in the receiving opening and the guide section fits without play in the receiving opening. Expediently, the turn knob comprises a rotational stop member and the receiving opening comprises counter stops cooperating with the rotational stop member.

Preferably, the securing mechanism further comprises a snap connection for securing the inner section and the receiving opening relative to one another, the snap connection comprising a first element positioned at an inner periphery of the receiving opening and a second element positioned at an outer periphery of the inner section.

Advantageously, the second element is a ball. The first element is preferably a leaf spring positioned so as to intersect a circular path, described by the outer periphery of the inner section upon rotation about an axis of rotation of the actuating element, wherein a plane of the leaf spring is parallel to the axis of rotation.

Preferably, the inner section has an external flat surface extending parallel to the axis of rotation and the leaf spring in a stretched position thereof rests at the external flat surface of the inner section. The inner section may have two such external flat surfaces angularly positioned adjacent to one another wherein one of the flat surfaces is coordinated with the engaged position and the other flat surface is coordinated with the disengaged position.

Preferably, the head is a nut and has a size identical to the size of a clamping nut for the clamping of the tool member.

Preferably, the cam member is an involute tooth. Advantageously, the lock bolt has a circumferential groove and the cam member is positioned in the circumferential groove.

Expediently, an axial length of the circumferential groove is substantially identical to the stroke of the cam member.

The axial length of the circumferential groove is preferably smaller than the stroke of the cam member.

Preferably, the housing has a bore in which the lock bolt is displaceably guided, the cam member projecting into the bore in any position into which the cam member is displaced by actuating the actuating element.

The lock bolt which is biased by a spring into the engaged position is positioned axially displaceably in the housing of the working tool whereby an actuating element that is positioned adjacent to the lock bolt projects with a cam member into the travel path of the lock bolt. The lock bolt is thus lifted by the cam member counter to the force of the spring from the engaged position into the disengaged position whereby the cam member in its securing position is locked at the housing and secures the lock bolt counter to the force of the spring in the disengaged position. When the lock bolt becomes difficult to displace, the operability of the working tool remains intact because the lifting of the lock bolt from the engagement opening is achieved with the actuating force and not with a prestressed spring. When it is possible to actuate with the cam member the lock bolt also in the direction toward the engaged position, it is advantageously possible to displace the lock bolt within the bore in the housing in the axial direction in order to maintain its movability without having to open the working tool.

Preferably, the cam member can be secured in the securing position at the housing of the working tool by a frictional connection for which purpose the actuating element rests frictionally at a surface of the housing. This can be achieved by applying the force of a spring so that the magnitude of the frictional engagement can be adjusted by properly selecting the spring. The frictional connection supports the spring force acting on the lock bolt in the disengaged position in a secure manner.

The actuating element is preferably in the form of a turn knob which comprises a head positioned external to the housing and an inner section to which the cam member is connected. The head of the turn knob is provided with an annular flange which faces an annular surface at the housing and is secured thereat by the spring in frictional connection.

Between the cylindrical actuating element and the housing a snap connection is provided with which the disengaged position is secured so that the control force of the spring that loads the lock bolt is securely supported.

The snap connection may be in the form of a ball with coordinated snap receiving opening or advantageously in the form of a leaf spring connected to the housing which intersects in the manner of a secant the circular path of the actuating element described upon rotation about its axis of rotation. The plane (of areal extension) of the leaf spring can be positioned approximately parallel to the axis of rotation. For reaching a defined snap position, the leaf spring with one side thereof rests at a flat surface of the mantle surface of the cylindrical actuating element which is parallel to the axis of rotation. Preferably, the cam member in any position into which it is displaced upon actuating the actuating element projects into the axial bore of the housing in which the lock bolt is guided. In order to ensure this, the turn knob may be provided with a rotational stop and the receiving opening of the housing may be provided with cooperating counter stops.

In order to ensure that an actuation of the lock bolt with the cam member in the direction toward the engaged position as well as in the direction of the disengaged position is possible when the lock bolt becomes difficult to displace, it is suggested that the axial length of the groove within the lock bolt corresponds approximately to the stroke of the cam member. Preferably, the axial length is slightly smaller than the stroke of the cam member. Via the actuating force to be applied, the lock bolt can at least be displaced along its initial travel path so that a lock bolt which is frozen within the axial bore can be loosened.

BRIEF DESCRIPTION OF THE DRAWINGS

The object and advantages of the present invention will appear more clearly from the following specification in conjunction with the accompanying drawings, in which:

FIG. 4c shows a side view of the cutter head, partly in section, with the securing mechanism in the engaged position;

FIG. 5c shows a detail of the part sectional view of FIG. 4c;

FIG. 6 shows a part-sectional view of the securing mechanism with the snap connection defining the securing position;

DESCRIPTION OF THE PREFERRED EMBODIMENTS

The inventive securing mechanism for the drive shaft of a rotating tool member of a working tool is represented as an embodiment for the cutter head of a cutting device.

Figure 3:
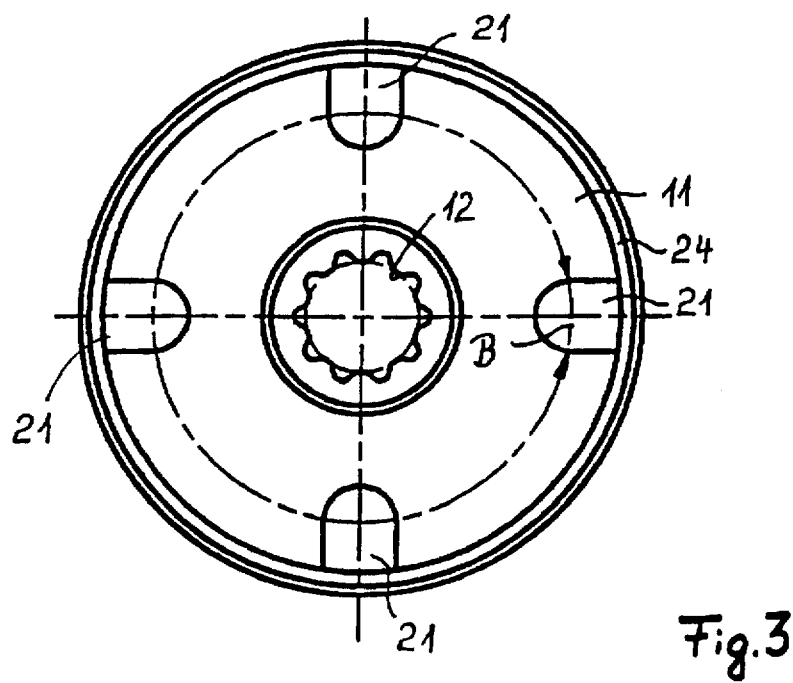
FIG. 3 shows a top view of a securing disk fixedly connected to the drive shaft of the cutter head.

The cutter head 1 comprises a housing 2 in which the drive shaft 3, extending over the height of the housing 2, is arranged. The drive shaft 3 is secured with two roller bearings 4 and 5 within the housing 2 whereby in the area between the two roller bearings 4 and 5 a bevel gear 6 is arranged on the drive shaft 3. The bevel gear 6 meshes with a non-represented drive bevel gear. This drive bevel gear is driven by a shaft which is positioned in a guide tube extending into a connector 7 (FIG. 1) and fixedly connected to the housing 2 of the cutter head 1 by a clamp 8. The housing 2 is closed off at the side facing the tool member 10 by a protective ring 9 which in section is somewhat hood-shaped. Within the protective ring 9 a securing element is fixedly connected to the drive shaft 3. In the shown embodiment the securing element is in the form of a securing disk 11. As shown in FIG. 3, the securing disk 11 is provided at its inner periphery with a keying 12 which cooperates with a keying 13 of the drive shaft 3 so as to provide positive locking. The protective ring 9 which receives the securing disk 11 is closed off by a protective disk 14 whereby the edge 14a of the protective disk and the edge 9a of the protective ring 9 overlap in the axial direction. The gap s between the edges 9a and 14a is of such a size that the protective disk 14 can rotated unimpeded within the protective ring 9. On the other hand, the gap s is so small that the penetration of course dirt particles is prevented. The protective disk 14 can be expediently fixedly connected to the securing disk 11. Adjacent to the protective disk 14 the tool member 10, for example, a cutting blade, is slipped onto the drive shaft 3 and is axially clamped thereto with a clamping nut 16 and a pressure disk 15 such that the tool member 10 is fixedly connected to the drive shaft 3. The clamping nut 16 is threaded onto a thread 17 provided at the free end of the drive shaft 3. A plastic ring 18 is inserted into the clamping nut 16 for securing the clamping nut.

At the housing 2 of the cutter head 1 a lateral lubricant opening 19 is provided which opens into a space between the roller bearings 4, 5 and which is closed off hermetically by a closure screw 20.

The securing disk 11 is provided with an engagement opening 21 for engaging the locking section 22 (FIG. 5a) of the lock bolt 23. In order to avoid any imbalance, each engagement opening 21 has positioned diametrically opposite thereto an engagement opening 21 of the same size. In the shown embodiment the securing disk 11 is provided with four engagement openings 21 (FIG. 3).

Figure 2:
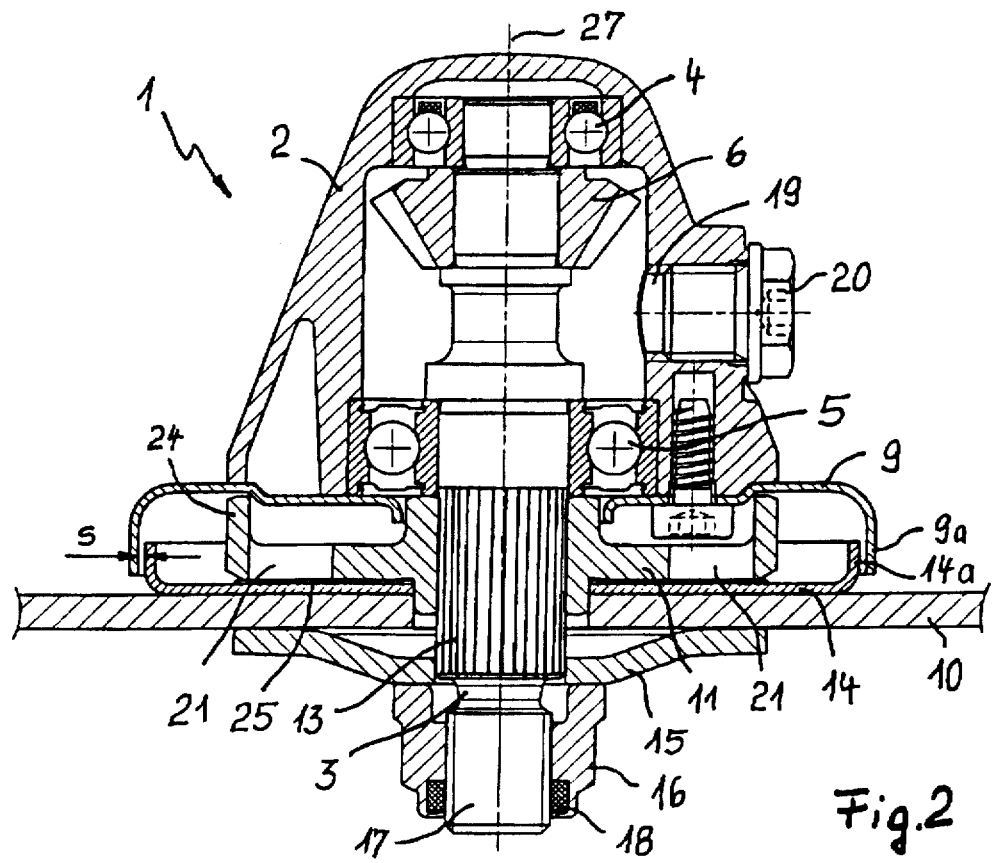
FIG. 2 shows a section along line II—II of FIG. 1.

As can be seen in FIGS. 2 and 3, the securing disk has an outer edge 24 projecting axially relative to the housing 2 which edge 24 extends substantially without play to the protective ring 9. At the side facing away from the housing 2, a protective plate 25 is arranged between the protective disk 14 and the securing disk 11 which corresponds substantially to the outer diameter of the securing disk 11. In this manner, the engagement openings 21 extending to the edge 24 are substantially covered by the protective plate 25. The space between the protective plate 25, the edge 24 of the securing disk 11, and the protective ring 9 is thus substantially sealed against penetration of dirt particles.

Figure 4A:
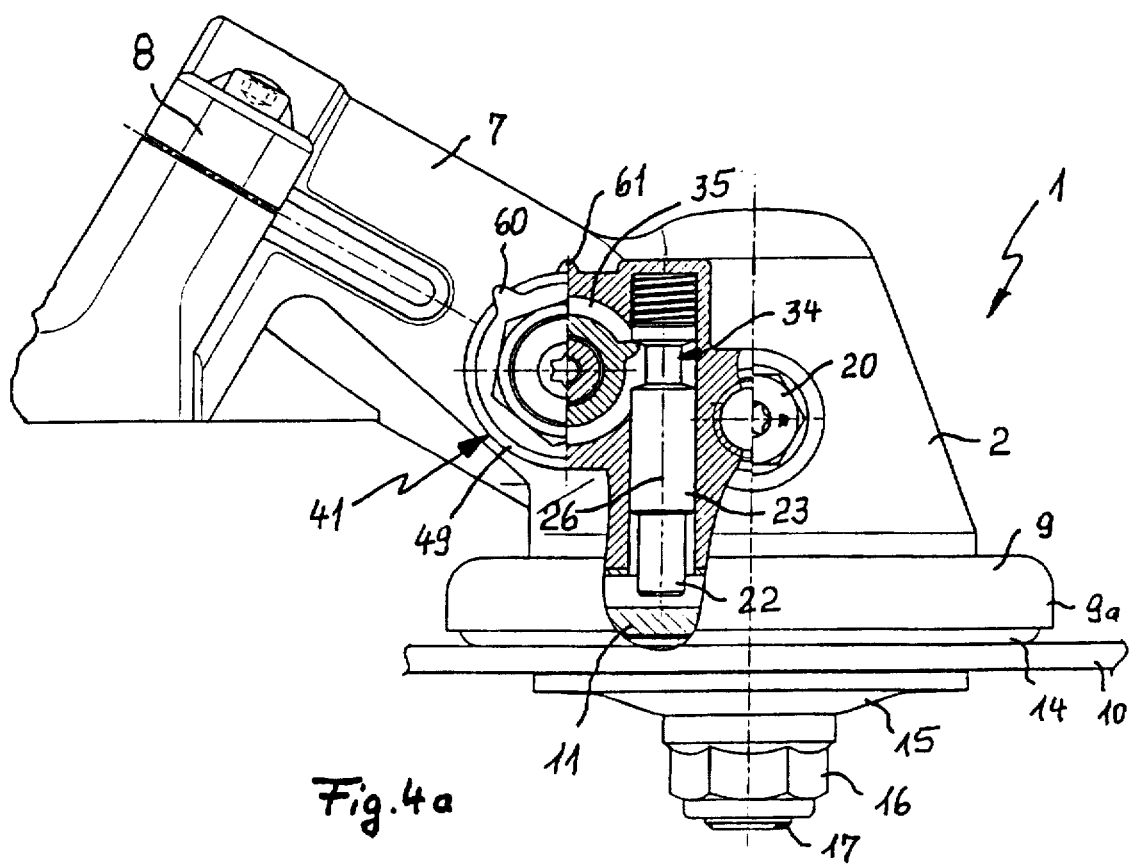
FIG. 4a shows a side view of the cutter head partly in section with the securing mechanism being in the disengaged position.
Figure 4B:
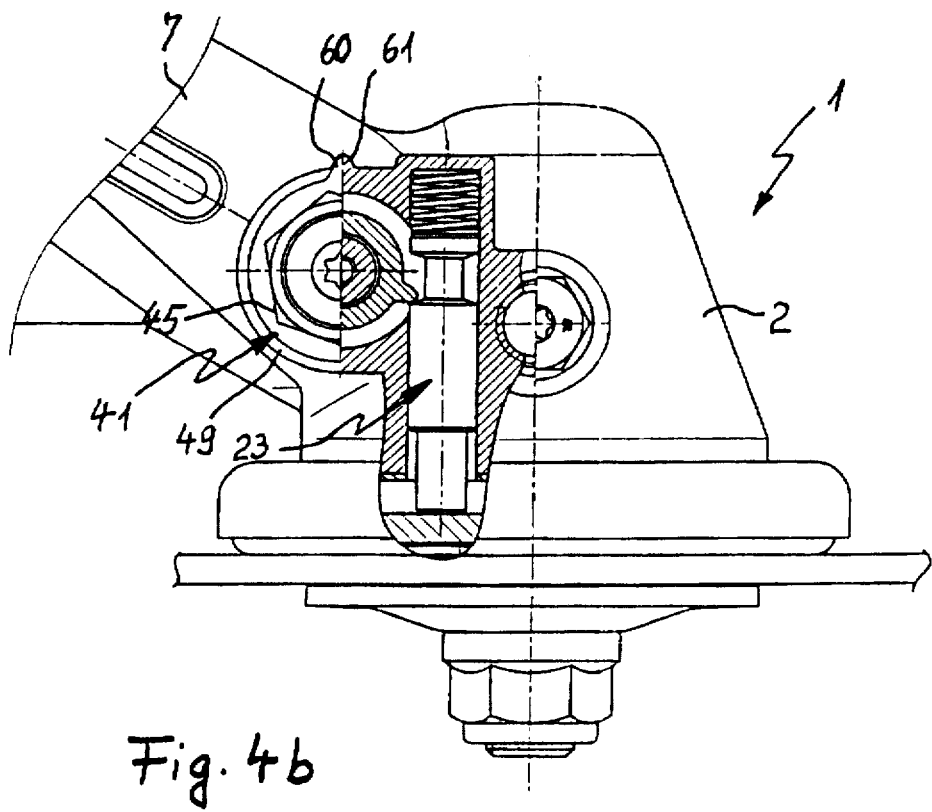
FIG. 4b shows a side view of the cutter head partly in section with the securing mechanism in the disengaged position.

The lock bolt 23 in the shown embodiment is arranged substantially perpendicularly, preferably exactly perpendicularly, to the securing disk 11. As shown in FIGS. 4a to 4c, the longitudinal axis 26 of the lock bolt 23 is thus parallel to the axis of rotation 27 of the drive shaft 3. The lock bolt 23 is positioned in an axial housing bore so as to be axially displaceable. The housing bore 28 is preferably embodied as a blind bore 28. Between the bottom 29 of the blind bore 28 and the facing end face 30 of the lock bolt 23, a spring 31 is arranged which in the shown embodiment is a pressure spring. It is also possible to use a plate spring or any other force storage means.

The end of the lock bolt 23 facing away from the end face 30 forms the locking section 22 which is embodied so as to engage the engagement opening 21 of the securing disk 11. Preferably, the diameter of the locking section 22 is smaller than the base body 33 of the lock bolt 23. Preferably, the diameter of the locking section 22 is slightly smaller than the width b of an engagement opening 21 (FIG. 3) measured in the circumferential direction of the disk.

Between the locking section 22 and the end face 30 which is loaded by the spring 31 the base body 33 is provided with a recess, especially in the form of a circumferential groove 32. This provides an actuating section 34 of the lock bolt 23.

The cam member 40 of the turn knob 41 projects into this circumferential groove 32. As can be seen in FIGS. 1 and 5a to 5c the turn knob 41 is received in a cylindrical receiving opening 35 of the housing 2. The axis 36 of the cylindrical receiving opening 35 is positioned transverse to the axis 37 of the blind bore 28. The cylindrical receiving opening 35 intersects the blind bore 28 in the area of the actuating section 34, respectively, the circumferential groove 32 of the lock bolt 23. A radial plane of the cylindrical receiving opening 35 is positioned preferably exactly at a right angle to the radial plane of the blind bore 28.

The turn knob 41 comprises a first inner section 43 positioned within the cylindrical receiving opening 35 to which is connected at one end a guide section 44 which fits exactly into the open end of the cylindrical receiving opening 35. The head 42 of the turn knob 41 is connected to the guide section 44 and positioned external to the housing which, as shown in FIGS. 4a to 4c, is embodied in the shape of a nut 45. The size of the nut 45 corresponds preferably to the size of the clamping nut 16.

The turn knob 41 is in the form of a hollow cylinder whereby the inner diameter of the head 42 is greater than the inner diameter of the inner section 43. The thus formed inner annular shoulder 46 serves as an abutment surface for the circumferential edge of a plate spring 47 which is preferably axially secured by a screw 48 on the annular shoulder 46. The screw 48 is threaded into a fastening dome 38 of the housing 2 which extends into the interior section 43 of the turn knob 41 and projects slightly past the annular shoulder 46. The free end 39 of the fastening dome 38 is of a slightly lesser diameter and penetrates the plate spring 47 so that the screw 48 can be fastened without blocking the turn knob 41.

Due to the axial spring force of the plate spring 47 an outer annular flange 49 of the head 42 is forced axially onto the annular surface 50 of the housing 2. Between the annular flange 49 and the annular surface 50 a frictional connection is thus provided which impedes frictionally the rotational movement of the turn knob 41. The frictional connection of the annular flange 49 and the annular surface 50 of the housing 2 ensures furthermore a sealing of the cylindrical receiving opening 35 against plant juices, dirt etc. Advantageously, the contacting annular surfaces are machined.

Figure 1:
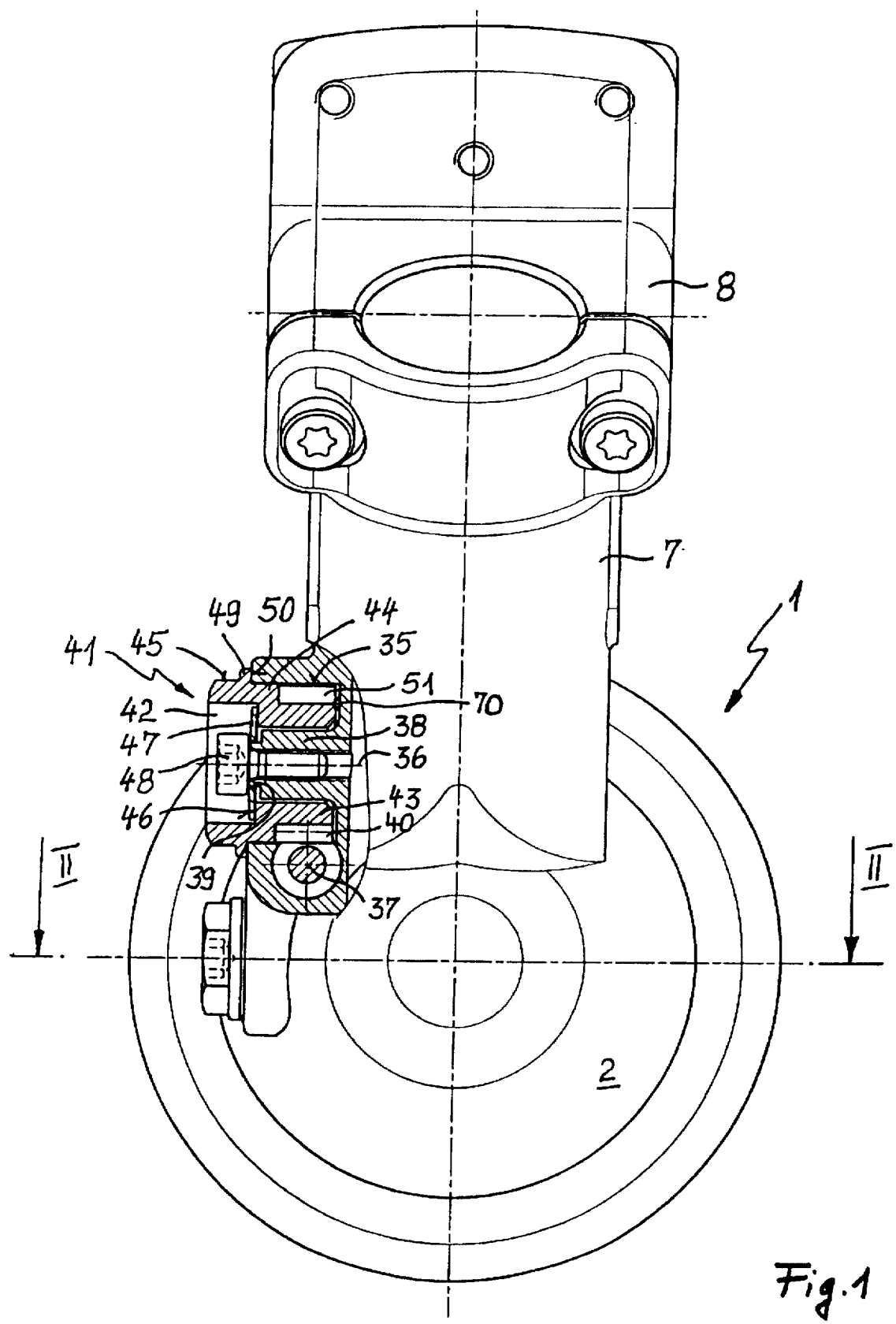
FIG. 1 shows a top view, partly in section, of the cutter head of a cutting device with securing mechanism.

The inner section 43 of the turn knob 41 is provided at its circumference with the radially extending cam member 40 which, as shown in FIG. 1, preferably extends over the entire axial length of the inner section 43 and connects to the guide section 44. The cam member 40 is shaped as an involute tooth so that essentially a point-like contact of the cam member 40 at the cooperating annular shoulder 40a of the recess (circumferential groove 32) is provided. Preferably, the annular shoulder 40a is beveled over its entire radial height so that a jamming between the cam member 40 and the lock bolt 23 is substantially prevented. The other annular shoulder of the recess 32 facing the annular shoulder 40a is preferably of identical design.

The rotational movement of the turn knob 41 is limited by a rotational stop member 51 (FIG. 5a), which in the shown embodiment is positioned substantially opposite the cam member 40 at the outer circumference of the inner section 43. Coordinated with the rotational stop 51 in the shown embodiment are counter stops 52 in both rotational directions which are fastened to the housing so that the rotational movement of the turn knob 41 and thus the stroke of the cam member 40 is constructively limited. In this context it is suggested that the cam member 40 in each possible displaced position, i.e., over the entire stroke, projects into the housing bore 28. The cam member 40 thus engages in any possible position the circumferential groove 32 so that an engagement of the cam member 40 at the annular shoulders of the circumferential groove 32 is possible at any time.

Figure 5A:
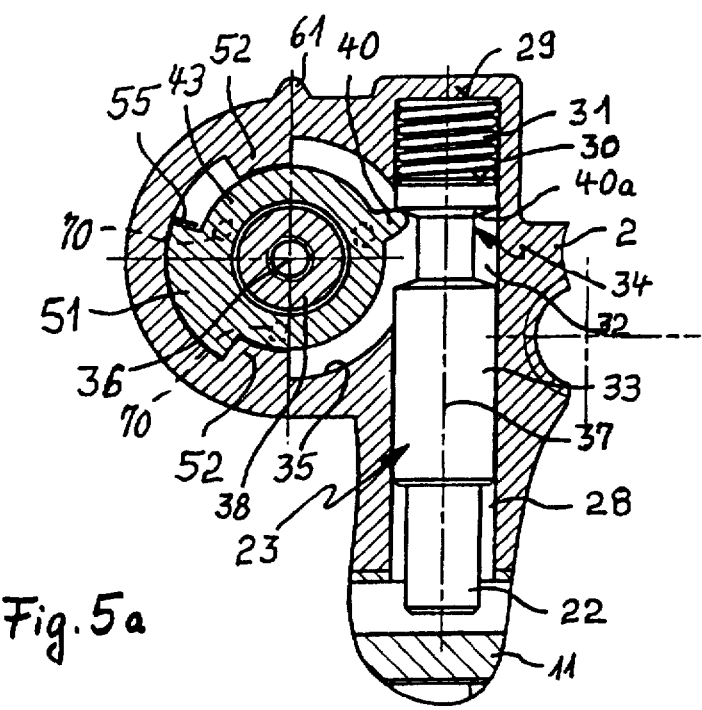
FIG. 5a shows a detail of the section view of FIG. 4.

FIGS. 4a and 5a show the disengaged position of the lock bolt 23. The cam member 40 is located at the annular shoulder 40a of the circumferential groove 32, preferably with point contact. Since the turn knob 41 is frictionally secured with the spring, which is preferably in the form of a plate spring 47, via the annular flange 49 at the annular surface 50 of the housing, the cam member 40 is thus secured in this position at the housing 2. The force of the compressed coil spring 31 is frictionally transmitted via the cam member 40 and the return knob 41 into the annular contact area between the annular flange 49 and the annular surface 50 of the housing. It is advantageous that the average diameter of the annular flange 49, respectively, of the annular surface 50 is approximately at the height of the point of engagement of the cam member 40 at the annular shoulder 40a of the circumferential groove 32. By enlarging the annular flange 49, respectively, the head 42 it is possible at any time, by employing greater leverage, to support a greater spring force at the lock bolt 23.

It may be advantageous to secure the lock bolt 23 in the disengaged position with positive locking at the housing 2. For this purpose, in the area of the rotational stop member 51 at the bottom of the cylindrical receiving opening 35 a projection or a step 55 may be provided which in the disengaged position according to FIG. 5a is engaged from behind by the rotational stop member 51. It may also be advantageous to provide at the bottom of the opening 35 a preferably part spherical projection 70 onto which the turn knob 41 glides counter to the force of the plate spring 47. Preferably, the projection engages a corresponding depression at the end face of the inner section 43 of the turn knob 41 so that a snap connection is provided. This snap connection is provided in addition to the frictional connection as a safety means against accidental release of the securing mechanism.

A different kind of securing mechanism of the turn knob 41 is shown in FIG. 6. This rotational securing mechanism can be provided instead of or in addition to a securing with frictional connection. For this purpose, between the outer circumference of the inner section 43 and the inner periphery of the cylindrical receiving opening 35 a snap connection is provided. This snap connection is comprised of a radial blind bore with a spring 83 positioned therein and a ball 82 which can be pushed into the blind bore against the force of the spring 83. The ball 82 engages with part of its periphery a snap opening 80 or a snap opening 81 provided in the side wall of the cylindrical receiving opening 35. The ball 82 engages with less than half of the ball surface so that upon rotation of the turn knob the ball 82 is forced into the blind bore counter to the force of the spring 83. In the representation of FIG. 6 the snap opening 80 serves to secure the disengaged position while the snap opening 81 secures additionally the operating position of the turn knob, respectively, the cam member 40.

In the shown embodiment the receiving bore for the spring 83 and the ball 82 is radially provided within the rotational stop member 51 which is positioned between the counter stops 52 at the housing. It may be expedient to provide the snap connection between the counter stops 52 and the inner section 43 of the turn knob 41.

FIG. 1 shows the arrangement of a snap connection between the bottom of the receiving opening 35 and the end face of the inner section 43 facing the bottom. Preferably, as shown in FIG. 5a schematically, projections 70 are provided over the circumference of the end face so as to be spaced equidistantly in the circumferential direction so that a canting of the turn knob upon gliding onto the projection 70 is prevented. The arrangement of the projection 70 at the bottom of the receiving opening 35 has the advantage that the annular flange 49 is lifted by approximately 3 mm relative to the facing annular surface 50 of the housing so that during the displacement from one end position at the first counter stop 52 to the end position at the second counter stop 52 and in the reverse direction the frictional connection is canceled to allow for easy turning of the turn knob.

Figure 5B:
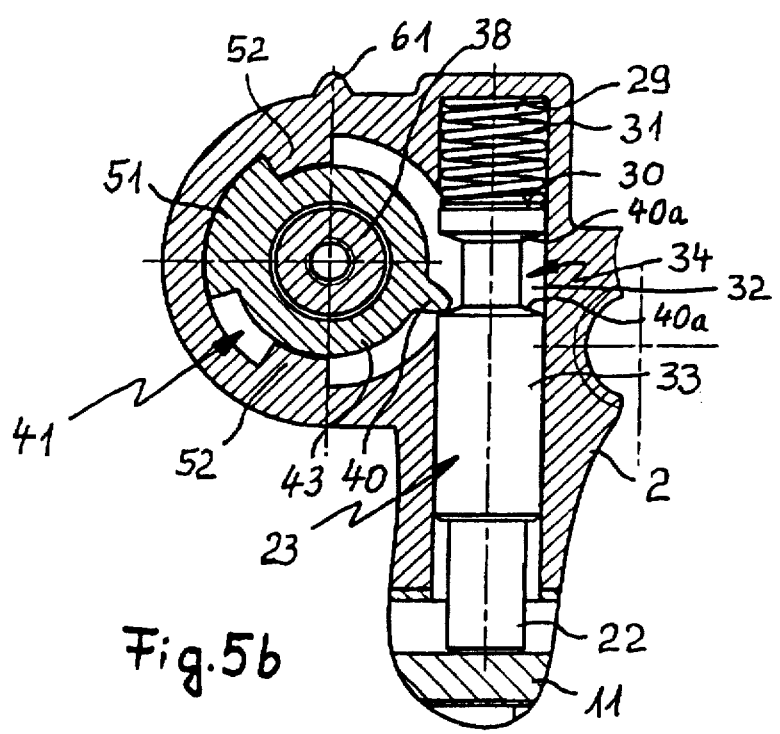
FIG. 5b shows a detail of the part-sectional view of FIG. 4.

When it is desired to block the cutting tool member 10 of the working tool, respectively, its drive shaft 3, for exchanging the tool member 10, the nut 45 of the turn knob 41 is displaced with a wrench which is also used for loosening the clamping nut 16. The head 42 of the turn knob 41 is provided with a radial nose 60 which, as shown in FIGS. 4b and 5b, is congruent in the release position of the securing mechanism with the nose 61 (see FIG. 4a) provided at the housing. The operator can thus detect when the securing mechanism is released. The lock bolt 23 is forced by the force of the spring 31 against the securing disk 11 independent of the position of the engagement openings 21. In the shown embodiment of FIG. 4b and 5b, the locking section 22 of the lock bolt 23 rests on the securing disk itself because no engagement opening 21 is congruent with the locking section 22. In order to be able to rotate the turn knob 41 without impediment into the release position according to FIG. 4b, the axial length of the recess, respectively, the circumferential groove 32 corresponds to the stroke of the cam member 40. Preferably, the axial length is identical to the stroke.

After releasing the securing mechanism, the operator will apply the wrench to the clamping nut 16, since the locking section 22 of the lock bolt 23 has not engaged one of the engagement openings 21, and will rotate the tool member 10 and thus the drive shaft 3 until one of the engagement openings 21 is congruent with the locking section 22. Under the force of the spring 31, which in the engaged position according to FIGS. 4c and 5c still applies a spring force, the lock bolt 23 will fall into one of the engagement openings 21 and the drive shaft 3 will thus be blocked against rotation. The force for loosening the clamping nut 16 is transmitted via the securing disk 11 directly onto the lock bolt 23 and the housing 2 without loading the bevel gear of the gear box of the cutter head 1. After exchanging the tool member 10 the turn knob 41 is again returned into the position according to FIG. 4a whereby the cam member 40, by contacting the annular shoulder 40a of the circumferential groove 32, axially lifts the lock bolt 23 so that the locking section 22 is moved out of the engagement opening 21. The tool member 10 is thus freed for driving by the drive shaft 3. In the disengaged position represented in FIGS. 4a and 5a the force of the spring 31 is frictionally supported by the turn knob 41 and/or is transmitted into the housing 2 by the projection 55 in a positive locking manner.

The turn knob 41 may be comprised of a sintered material. Preferably, the turn knob 41 is comprised of plastic, especially sintered plastic. The lock bolt 23 in contrast is preferably made of metal. An embodiment in which it is comprised of plastic may be expedient in certain situations.

In order to ensure a secure fixation of the pressure spring at the end face 30 of the lock bolt 23 in the engaged position, a securing section 59 may be provided at the lock bolt 23 which engages the coil spring.

In the embodiment according to FIGS. 7a to 7d a securing mechanism is shown which in its basic design corresponds to the one of FIGS. 5a to 5c. For same parts the same reference numerals are used. The securing mechanism according to FIGS. 7a to 7d is provided with a snap connection which is essentially comprised of a leaf spring 90 which cooperates with flat surfaces 94 and 95 provided at the cylindrical inner section 43 of the turn knob 41. The leaf spring 90 is loosely supported with its free ends 91, 92 in housing pockets 89 of the housing 2 whereby in the stretched position shown in FIGS. 7a, 7c and 7d it extends approximately parallel to the axis of rotation 36 of the turn knob 41. In the stretched position the leaf spring 90 in its longitudinal extension is approximately parallel to the axis 37 of the housing bore 28.

Figure 7A:
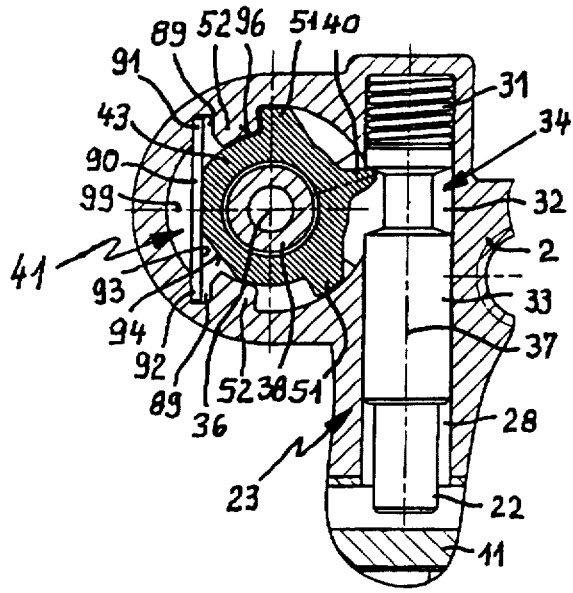
FIGS. 7a through 7d show in part section the securing mechanism with a snap connection in the form of a leaf spring in various positions.
Figure 7B:
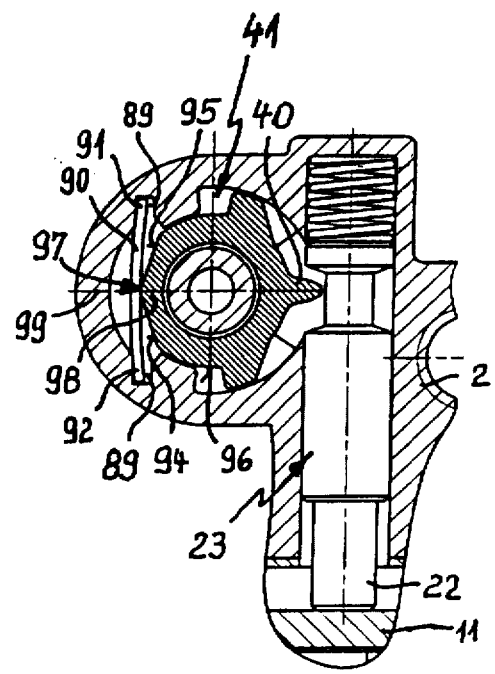
Figure 7C:
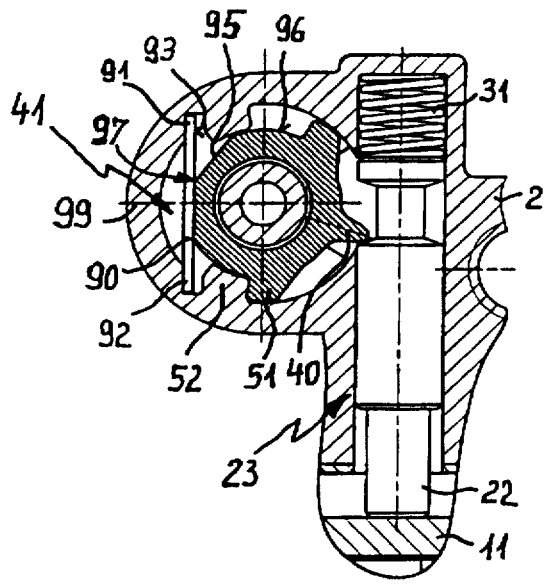
Figure 7D:
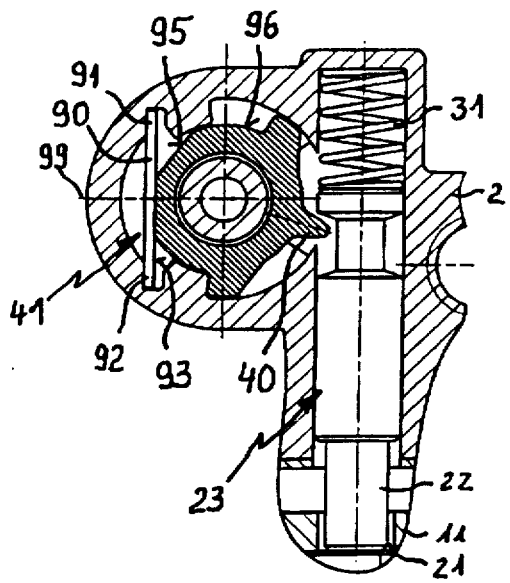

In the stretched position the leaf spring 90 rests with its flat side 93 facing the turn knob 41 at the flat surface 95 (FIG. 7a) or 94 (FIG. 7c, 7d). In this stretched position the leaf spring 90 intersects the mantle surface 96 of the cylindrical inner section 43 described by the circular path of the actuating element 41 upon rotation about the axis of rotation 36. This means that upon rotation of the turn knob 41 (actuating element) about the axis 36 the longitudinal edge 97 of the leaf spring 90 is displaced away from the axis of rotation 36 as is shown in FIG. 7b as an intermediate position. Positioned adjacent to the flat surface 95 a second flat surface 94 is provided. The two flat surfaces enclose an angle 98 of less than 180° at their common longitudinal edge 97. Upon further rotation of the turn knob 41 the longitudinal edge 97 is displaced toward one end 91 of the leaf spring 90 so that the spring 90 is elastically returned into its stretched position and lies flat with its flat side 93 at the flat surface 94. The flat surface 95 corresponds to the disengaged position of FIG. 7a while the flat surface 94 corresponds to the engaged position of FIG. 7d. In order to avoid overrotation of the turn knob 41 past the engaged position, respectively, disengaged position, stop members 51 are provided which cooperate with counter stops 52 at the housing. The stop members 51 are provided separately for the engaged position and the disengaged position and are located respectively in the circumferential direction between the cam member 40 and the adjacently positioned flat surfaces 94, 95.

The longitudinal edge 97 positioned between the flat surfaces 94 and 95 forms a cam of the snap connection which cooperates with the leaf spring 90. For displacement from the disengaged position into the engaged position the cam must be moved while overcoming the spring force of the leaf spring 90. The axis of rotation 36 of the turn knob 41 is positioned within the central plane 99.

In the representation of FIG. 7a the lock bolt 23 is held in the disengaged position counter to the force of the spring 31 whereby the embodiment of the leaf spring 90 and of the longitudinal edge 97 which is in the form of a lock cam is designed such that the torque required for displacement of the turn knob 41 is greater than the torque applied with the prestressed spring 31 of the lock bolt 23 onto the cam member 40. When the turn knob 41 is displaced, the leaf spring 90 is elastically deformed from the stretched position into the curved position of FIG. 7b whereby the loose support of its ends 91 and 92 within the housing pockets 98 is advantageous. As soon as the cam member 40 releases the lock bolt 23, the lock bolt 23 is displaced by the force of the prestressed spring 31 onto the securing disk 11. When no receiving opening 21 is provided below the locking section 22, the locking section 22 rests on the securing disk 11. The circumferential groove 32 has such an axial length that even though the lock bolt 23 does not yet engage a receiving opening 21, the turn knob 41 can be transferred into the snap position corresponding to the engaged position (FIG. 7d). In this snap position the flat surface 94 rests at the stretched leaf spring 90 whereby it is expedient to slightly prestress the leaf spring in the direction toward the flat spring slightly. This ensures that in each snap position the leaf spring 90 rests with a predetermined spring force at the flat surfaces 94, 95 which define the respective end positions. By rotating the securing disk 11, one of the receiving openings 21 is moved into the area of the locking section 22 until the lock bolt falls into one of these receiving openings 21. The lock bolt 23 is thus positioned in its engaged position.

For releasing the securing mechanism, the turn knob 41 is turned counter clockwise by displacing the leaf spring 90 until the secured position according to FIG. 7a has been reached again. The lock bolt 23 is removed from the engagement opening 21 of the securing disk 11 and is securely held in this position.

The present invention is, of course, in no way restricted to the specific disclosure of the specification and drawings, but also encompasses any modifications within the scope of the appended claims.

What we claim is:

1. A securing mechanism for securing a drive shaft of a rotating tool member of a working tool against rotation, said securing mechanism comprising:

a securing member fixedly connected to the drive shaft, said securing member having at least one engagement opening;

a lock bolt for engaging said at least one engagement opening;

said lock bolt axially displaceably positioned in a housing of the working tool;

a spring for biasing said lock bolt into engagement with said at least one engagement opening;

an actuating element for displacing said lock bolt from an engaged position, in which said lock bolt engages said at least one engagement opening, into a disengaged position, in which said lock bolt is removed from said engagement opening;

wherein said actuating element is positioned adjacent to said lock bolt and comprises a cam member extending into a travel path of said lock bolt;

wherein said cam member has a securing position in which said cam member is locked at said housing and secures said lock bolt against the force of said spring in said disengaged position;

wherein said cam member in said securing position is secured by a friction force at said housing;

wherein said friction force for securing said cam member at said housing is greater than the force of said spring.

2. A securing mechanism according to claim 1, wherein said cam member in said securing position is secured by a positive locking snap connection.

3. A securing mechanism according to claim 1, wherein said actuating element is a cylindrical turn knob comprising a head, positioned external to said housing, and an inner section, positioned inside said housing, wherein said cam member is connected to said inner section.

4. A securing mechanism according to claim 3, wherein said head has an annular flange and wherein said annular flange frictionally rests, biased by an axial force, at a surface of said housing.

5. A securing mechanism according to claim 3, wherein:

said actuating element further comprises a guide section between said head and said inner section;

said housing has a receiving opening;

said guide section and said inner section are received in said receiving opening; and said guide section fitting without play in said receiving opening.

6. A securing mechanism according to claim 5, wherein said turn knob comprises a rotational stop member and wherein said receiving opening comprises counter stops cooperating with said rotational stop member.

7. A securing mechanism according to claim 5, further comprising a snap connection for securing said inner section and said receiving opening relative to one another, said snap connection comprising a first element positioned at an inner periphery of said receiving opening and a second element positioned at an outer periphery of said inner section.

8. A securing mechanism according to claim 7, wherein said second element is a ball.

9. A securing mechanism according to claim 9, wherein said first element is a leaf spring positioned so as to intersect a circular path, described by said outer periphery of said inner section upon rotation about an axis of rotation of said actuating element, wherein a plane of said leaf spring is parallel to said axis of rotation.

10. A securing mechanism according to claim 9, wherein said inner section has an external flat surface extending parallel to said axis of rotation and wherein said leaf spring in a stretched position thereof rests at said external flat surface of said inner section.

11. A securing mechanism according to claim 10, wherein said inner section has two of said external flat surfaces angularly positioned adjacent to one another, wherein one of said flat surfaces is coordinated with said engaged position and the other flat surface is coordinated with said disengaged position.

12. A securing mechanism according to claim 3, wherein said head is a nut and has a size identical to the size of a clamping nut for clamping the tool member.

13. A securing mechanism according to claim 1, wherein said cam member is an involute tooth.

14. A securing mechanism according to claim 1, wherein said lock bolt has a circumferential groove and wherein said cam member is positioned in said circumferential groove.

15. A securing mechanism according to claim 14, wherein an axial length of said circumferential groove is identical to a stroke of said cam member.

16. A securing mechanism according to claim 14, wherein an axial length of said circumferential groove is smaller than a stroke of said cam member.

17. A securing mechanism according to claim 1, wherein said housing has a bore in which said lock bolt is displaceably guided, said cam member projecting into said bore in any position into which said cam member is displaced by actuating said actuating element.

18. A securing mechanism according to claim 6, wherein said actuating element comprises a centrally arranged plate spring secured to a shoulder of said head, said plate spring providing said axial force.

19. A securing mechanism for securing a drive shaft of a rotating tool member of a working tool against rotation, said securing mechanism comprising:

a securing member fixedly connected to the drive shaft, said securing member having at least one engagement opening;

a lock bolt for engaging said at least one engagement opening;

said lock bolt axially displaceably positioned in a housing of the working tool;

a spring for biasing said lock bolt into engagement with said at least one engagement opening;

an actuating element for displacing said lock bolt from an engaged position, in which said lock bolt engages said at least one engagement opening, into a disengaged position, in which said lock bolt is removed from said engagement opening;

said actuating element positioned adjacent to said lock bolt and comprising a cam member extending into a travel path of said lock bolt;

said cam member having a securing position in which said cam member is locked at said housing and secures said lock bolt against the force of said spring in said disengaged position;

said actuating element being a cylindrical turn knob comprising a head, positioned external to said housing, and an inner section, positioned inside said housing, wherein said cam member is connected to said inner section;

said actuating element further comprising a guide section between said head and said inner section;

said housing having a receiving opening;

said guide section and said inner section received in said receiving opening;

said guide section fitting without play in said receiving opening; and wherein said turn knob comprises a rotational stop member and wherein said receiving opening comprises counter stops cooperating with said rotational stop member.

20. A securing mechanism for securing a drive shaft of a rotating tool member of a working tool against rotation, said securing mechanism comprising:

a securing member fixedly connected to the drive shaft, said securing member having at least one engagement opening;

a lock bolt for engaging said at least one engagement opening;

said lock bolt axially displaceably positioned in a housing of the working tool;

a spring for biasing said lock bolt into engagement with said at least one engagement opening;

an actuating element for displacing said lock bolt from an engaged position, in which said lock bolt engages said at least one engagement opening, into a disengaged position, in which said lock bolt is removed from said engagement opening;

said actuating element positioned adjacent to said lock bolt and comprises a cam member extending into a travel path of said lock bolt;

said cam member having a securing position in which said cam member is locked at said housing and secures said lock bolt against the force of said spring in said disengaged position;

said actuating element being a cylindrical turn knob comprising a head, positioned external to said housing, and an inner section, positioned inside said housing, wherein said cam member is connected to said inner section; and said head being a nut and having a size identical to the size of a clamping nut for clamping the tool member.

\* \* \* \* \*